(12) United States Patent
Fan et al.

(10) Patent No.: US 10,903,911 B2
(45) Date of Patent: Jan. 26, 2021

(54) APPARATUS AND METHOD FOR ESTIMATING POLARIZATION SKEW

(71) Applicant: Fujitsu Limited, Kawasaki (JP)

(72) Inventors: Yangyang Fan, Beijing (CN); Zhenning Tao, Beijing (CN)

(73) Assignee: FUJITSU LIMITED, Kawasaki (JP)

(*) Notice: Subject to any disclaimer, the term of this patent is extended or adjusted under 35 U.S.C. 154(b) by 0 days.

(21) Appl. No.: 16/730,223

(22) Filed: Dec. 30, 2019

(65) Prior Publication Data
US 2020/0266901 A1   Aug. 20, 2020

(30) Foreign Application Priority Data

Feb. 19, 2019   (CN) .......................... 2019 1 0121364

(51) Int. Cl.
*H04B 10/61*   (2013.01)
*H04B 10/079*   (2013.01)

(52) U.S. Cl.
CPC ..... *H04B 10/6162* (2013.01); *H04B 10/0795* (2013.01); *H04B 10/613* (2013.01)

(58) Field of Classification Search
CPC .............. H04B 10/6162; H04B 10/613; H04B 10/0795; H04B 10/6165; H04B 10/6166
See application file for complete search history.

(56) References Cited

U.S. PATENT DOCUMENTS

| | | | | |
|---|---|---|---|---|
| 9,036,751 B1* | 5/2015 | Wang | ............... | H04B 10/25073 375/350 |
| 9,374,170 B2 | 6/2016 | Oota et al. | | |
| 9,806,822 B1* | 10/2017 | Rohde | ................ | H04B 10/0731 |
| 10,038,498 B1* | 7/2018 | Fan | ......... | H04B 10/50 |
| 10,715,259 B1* | 7/2020 | Hueda | .................... | H04B 10/40 |
| 2004/0136731 A1 | 7/2004 | Wang et al. | | |
| 2012/0076491 A1 | 3/2012 | Yan et al. | | |
| 2012/0189319 A1* | 7/2012 | Mo | .................... | H04B 10/6165 398/152 |
| 2012/0263456 A1* | 10/2012 | Tanaka | ............... | H04B 10/5055 398/25 |

(Continued)

FOREIGN PATENT DOCUMENTS

| CN | 102420658 A | 4/2012 |
|---|---|---|
| CN | 104348544 | 2/2015 |

OTHER PUBLICATIONS

Yangyang Fan, Yufeng Jiang, Junpeng Liang, Zhenning Tao, Hisao Nakashima, Takeshi Hoshida, Transceiver IQ imperfection Monitor by Digital Signal Processing in Coherent Receiver, Fujitsu, Jul. 7-11, 2019 (Year: 2019).*

(Continued)

*Primary Examiner* — Aristocratis Fotakis
(74) *Attorney, Agent, or Firm* — Staas & Halsey LLP

(57) ABSTRACT

Embodiments of this disclosure provide an apparatus and method for estimating polarization skew. The method includes: acquiring a plurality of coefficients of an adaptive equalizer of a receiving device; the plurality of coefficients of the adaptive equalizer include at least polarization skew of a transmitting device and polarization skew of the receiving device; and calculating the polarization skew of the transmitting device and the polarization skew of the receiving device according to the plurality of coefficients of the adaptive equalizer.

9 Claims, 6 Drawing Sheets

(56) References Cited

U.S. PATENT DOCUMENTS

| | | | | |
|---|---|---|---|---|
| 2013/0209089 A1* | 8/2013 | Harley | ............... | H04B 10/5561 |
| | | | | 398/25 |
| 2013/0287390 A1* | 10/2013 | Abe | ..................... | H04B 10/616 |
| | | | | 398/26 |
| 2014/0205280 A1* | 7/2014 | Choe | .................. | H04B 10/0779 |
| | | | | 398/25 |
| 2015/0304025 A1 | 10/2015 | Liu et al. | | |
| 2018/0034552 A1* | 2/2018 | Oyama | ............. | G02B 6/12009 |
| 2020/0280373 A1* | 9/2020 | Palmer | ............... | H04Q 11/0062 |
| 2020/0295842 A1* | 9/2020 | Hueda | ................... | H04B 10/40 |

OTHER PUBLICATIONS

Yufeng Jiang, Yangyang Fan, Jingnan Li, Zhenning Tao, Calibration of Polarization Skews in Optical Coherent Transceiver based on Digital Signal Processing, Fujitsu, Sep. 2019 (Year: 2019).*

Gao Chao et al. "Distributed optical fiber sensing system based on SOP time delay estimation", Journal of Optoelectronics·Laser vol. 23, No. 1, Jan. 2012.

R. R. Muller et al., "Blind Receiver Skew Compensation and Estimation for Long-Haul Non-Dispersion Managed Systems Using Adaptive Equalizer", Journal of Lightwave Technology, vol. 33, No. 7, Apr. 1, 2015, p. 1315.

S Savory, "Digital filters for coherent optical receivers", Optics Express, vol. 16, No. 2, Jan. 21, 2008, pp. 804.

M. Paskov et al., "Blind Equalization of Receiver in Phase/Quadrature Skew in the Presence of Nyquist Filtering", IEEE Photonics Technology Letters, vol. 25, No. 24, Dec. 15, 2013, p. 2446.

Extended European Search Report dated Jun. 25, 2020 in European Patent Application No. 19215195.9.

Fan Yangyang et al., "Experimental Verification of IQ Imbalance Monitor for High-Order Modulated Transceivers", 2018 European Conference on Optical Communication (ECOC), IEEE, Sep. 23, 2018, pp. 1-3, XP033445056.

* cited by examiner

APPARATUS AND METHOD FOR ESTIMATING POLARIZATION SKEW

CROSS-REFERENCE TO RELATED APPLICATIONS

This application is based on and hereby claims priority to Chinese Application No. 201910121364.8, filed Feb. 19, 2019, in the State Intellectual Property Office of China, the disclosure of which is incorporated herein by reference.

TECHNICAL FIELD

This disclosure relates to the field of communication technologies, and in particular to an apparatus and method for estimating polarization skew.

BACKGROUND

In a coherent optical communication system based on dual polarization modulation, there are four channels respectively at a transmitting device and a receiving device, corresponding to in-phase and quadrature paths of the respective two polarization states. Due to differences between performances of devices in each channel, each channel produces different skew to signals, resulting in skew between the in-phase and quadrature paths within the polarization state (hereinafter referred to as in-phase quadrature skew, denoted by IQ skew) and skew between polarization states (hereinafter referred to as polarization state skew, denoted by polarization skew).

In general, the presence of polarization skew will bring an effect on a system performance. For example, in a system employing polarization interleaving coding, skew of a transmitter and a receiver will affect a signal performance of a receiving device after de-interleaving.

For an adaptive equalizer of a high baud rate high-order modulation format signal, quadrature phase shift keying (QPSK) pilot signals are usually interpolated to update coefficients of a constant modulus algorithm (CMA), and polarization skew in the transmitter may cause misalignment of QPSK-pilot symbols on the two polarization states, thereby affecting calculation of coefficients of the equalizer. The polarization skew may be compensated by a digital signal processing (DSP) algorithm, but compensation for relatively large polarization skew will increases complexity of implementation of the DSP.

It should be noted that the above description of the background is merely provided for clear and complete explanation of this disclosure and for easy understanding by those skilled in the art. And it should not be understood that the above technical solution is known to those skilled in the art as it is described in the background of this disclosure.

Documents advantageous to understanding of this disclosure and conventional technologies are listed below, which are incorporated herein by reference, as they are fully described in this text.

Non-patent document 1: M. Paskov et al., "Blind Equalization of Receiver In-Phase/Quadrature Skew . . . ", Photon. Technol. Lett., Vol. 25, no. 24, p. 2446 (2013);

Non-patent document 2: R. R. Muller et al., "Blind Receiver Skew Compensation and Estimation . . . ", J. Lightwave Technol., Vol. 33, no. 7, p. 1315 (2015); and Non-patent document 3: S Savory, "Digital filters for coherent optical receivers", Optics Express, Vol. 16, No. 2, pp 804 (2008).

SUMMARY

Regarding the above technical problem, embodiments of this disclosure provide an apparatus and method for estimating polarization skew, in which it is expected to accurately and efficiently estimate polarization skew at a relatively lower cost.

According to an embodiment of this disclosure, there is provided an apparatus for estimating polarization skew. The apparatus including:

a processor configured to acquire a plurality of coefficients of an adaptive equalizer of a receiving device; wherein the coefficients of the adaptive equalizer at least includes the polarization skew of a transmitting device and polarization skew of the receiving device; and a calculator configured to calculate the polarization skew of the transmitting device and the polarization skew of the receiving device according to the plurality of coefficients of the adaptive equalizer.

According to an embodiment of this disclosure, there is provided a method for estimating polarization skew. The method including:

acquiring a plurality of coefficients of an adaptive equalizer of a receiving device; wherein, the coefficients of the adaptive equalizer at least include the following components: polarization skew of a transmitting device and polarization skew of the receiving device; and calculating the polarization skew of the transmitting device and the polarization skew of the receiving device according to the plurality of coefficients of the adaptive equalizer.

One advantage of the embodiments of this disclosure exists in that the polarization skew of the transmitting device and the polarization skew of the receiving device may be estimated by using the coefficients of the adaptive equalizer, without needing expensive measurement instruments, which is not only low in cost, but also is applicable to calibration in a production stage, and is applicable to real-time monitoring of a transceiver in an actual optical transmission system.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, operations or components but does not preclude the presence or addition of one or more other features, integers, operations, components or groups thereof.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

These and further aspects and features of this disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

Figure 1:
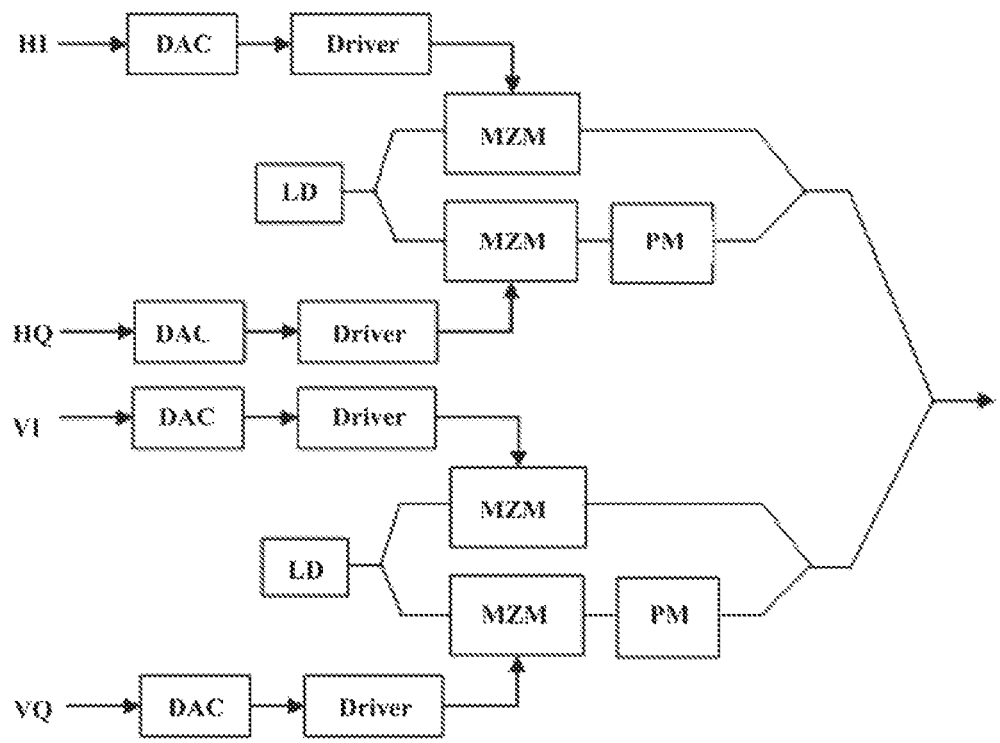
FIG. 1 is a schematic diagram of a dual-polarization optical transmitter according to an embodiment of this disclosure.

FIG. 1 is a schematic diagram of a dual-polarization optical transmitter of an embodiment of this disclosure. As shown in FIG. 1, a transmitting device has four channels corresponding to in-phase (I) and quadrature (Q) paths of two polarization states HV, which are denoted by HI, HQ, VI and VQ. As shown in FIG. 1, the transmitting device further includes a digital-to-analog converter (DAC,), a driver, a laser diode (LD), a Mach-Zehnder modulator (MZM), and a phase modulator (PM), etc.

Figure 2:
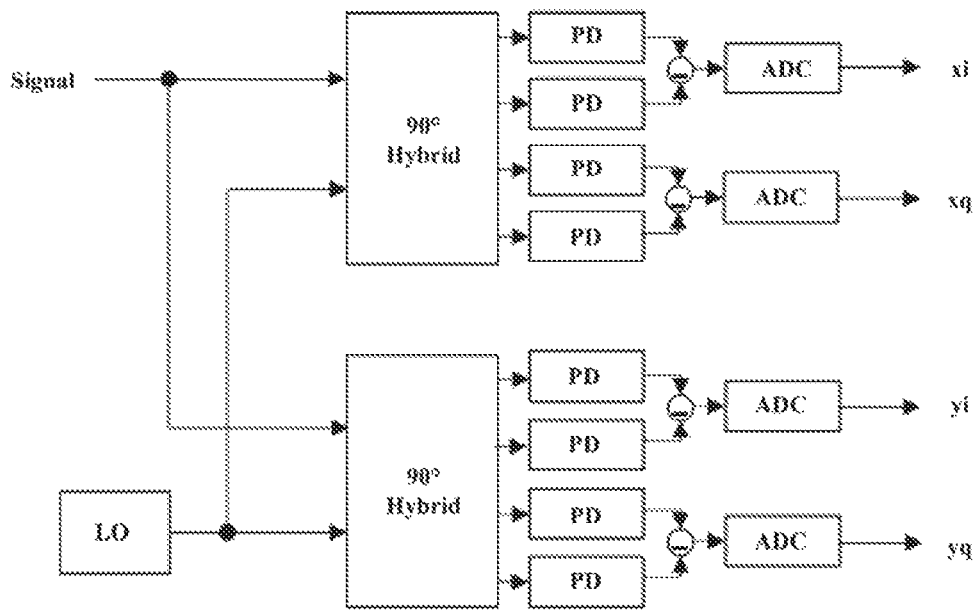
FIG. 2 is a schematic diagram of a dual-polarization optical coherent receiver according to an embodiment of this disclosure.

FIG. 2 is a schematic diagram of a dual-polarization optical coherent receiver of an embodiment of this disclosure. As shown in FIG. 2, a receiving device also has four channels corresponding to the in-phase (i) and quadrature (q) paths of the two polarization states xy, respectively, which are denoted by xi, xq, yi, yq. As shown in FIG. 2, the receiving device further includes an analog-to-digital converter (ADC), a hybrid, a local oscillator (LO), and a phase demodulator (PD), etc.

As shown in FIGS. 1 and 2, skew in the in-phase and quadrature paths in the H-polarization state at the transmitting device is $\tau_{hi}$, $\tau_{hq}$, and skew in the in-phase and quadrature paths of the V-polarization state at the transmitting device is $\tau_{vi}$, $\tau_{vq}$; likewise, skew in the x and y polarization states at the receiving device is $\tau_{xi}$, $\tau_{xq}$, $\tau_{yi}$ and $\tau_{yq}$. Then, polarization skew $\tau_{xy,T}$ of the transmitting device and polarization skew $\tau_{xy,R}$ of the receiving device may be defined as follows:

$$\tau_{xy,T} = \frac{\tau_{vi} + \tau_{vq}}{2} - \frac{\tau_{hi} + \tau_{hq}}{2},$$

$$\tau_{xy,R} = \frac{\tau_{yi} + \tau_{yq}}{2} - \frac{\tau_{xi} + \tau_{xq}}{2}.$$

The optical transmitter and receiver shown in FIGS. 1 and 2 constitute a back-to-back system, such as a MIMO (multiple input multiple output) system containing four paths of input and four paths of output. An impairment of the system may be compensated at the receiving device by, for example, an adaptive equalizer of a 4×4 structure.

It was found by the inventors that the coefficients in the adaptive equalizer of the receiving device include at least the following components: polarization skew of the transmitting device and polarization skew of the receiving device; thus, multiple coefficients of the adaptive equalizer may be used to calculate the polarization skew $\tau_{xy,T}$ of the transmitting device and the polarization skew $\tau_{xy,R}$ of the receiving device. The embodiments of this disclosure shall be described below in detail.

Embodiment 1

Figure 3:
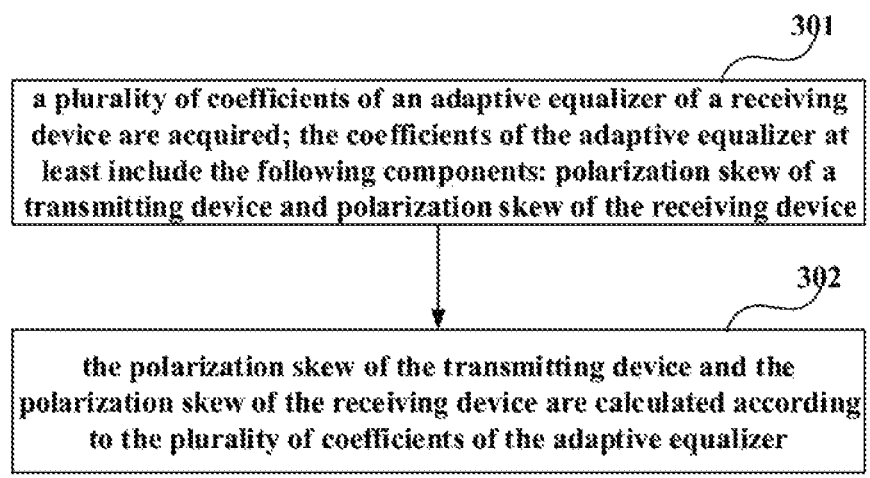
FIG. 3 is a schematic diagram of the method for estimating polarization skew according to an embodiment of this disclosure.

These embodiments of this disclosure provide a method for estimating polarization skew. FIG. 3 is a schematic diagram of the method for estimating polarization skew of Embodiment 1 of this disclosure. As shown in FIG. 3, the method includes:

Operation 301: a plurality of coefficients of an adaptive equalizer of a receiving device are acquired; the coefficients of the adaptive equalizer at least include the following components: polarization skew of a transmitting device and polarization skew of the receiving device; and Operation 302: the polarization skew of the transmitting device and the polarization skew of the receiving device are calculated according to the plurality of coefficients of the adaptive equalizer.

In an embodiment, the adaptive equalizer may be configured in a DSP of the receiving device. For example, the adaptive equalizer for compensating the polarization skew in the embodiments of this disclosure may be located before a frequency offset compensator and a phase noise compensator, and a constant modulus algorithm (CMA), a least mean square (LMS) algorithm based on decision feedback, etc., may be adopted in the calculation of the coefficient of the adaptive equalizer. After the adaptive equalizer converges, its coefficients may be used to estimate the polarization skew. Reference may be made to related art for detailed contents of the DSP of the receiving device and the adaptive equalizer.

In an embodiment, the structure of the adaptive equalizer may be determined according to multiple coefficients of the adaptive equalizer; for example, the adaptive equalizer is of a 4×4 structure, or of a 4×2 structure, or of a 2×2 structure. For example, if the number of coefficients obtained after the adaptive equalizer converges is 16, it may be determined that the adaptive equalizer is of a 4×4 structure, and if the number of coefficients obtained after the adaptive equalizer converges is 8, it may be determined that the adaptive equalizer is of a 4×2 structure. However, this disclosure is not limited thereto, and structures of the adaptive equalizer may be determined in other ways.

In an embodiment, the coefficients of the adaptive equalizer further include the following components: in-phase quadrature skew of an x polarization state of the receiving device, and/or in-phase quadrature skew of ay polarization state of the receiving device. And the plurality of coefficients of the adaptive equalizer may be calculated to eliminate components of the in-phase quadrature skew of the x polarization state of the receiving device and the in-phase quadrature skew of they polarization state of the receiving device, and reserve components of the polarization skew of the transmitting device and the polarization skew of the receiving device.

In an embodiment, a part of the coefficients of the adaptive equalizer may be calculated to obtain diagonal element parameters $\varphi_+(f)$, and another part of the coefficients of the adaptive equalizer may be calculated to obtain secondary diagonal element parameters $\varphi_-(f)$; a sum of and a difference between the polarization skew $\tau_{xy,T}$ of the transmitting device and the polarization skew $\tau_{xy,R}$ of the receiving device may be calculated according to the diagonal element parameters $\varphi_+(f)$ and the secondary diagonal element parameters $\varphi_-(f)$; and $\tau_{xy,T}$ and $\tau_{xy,R}$ may be calculated according to the sum of and the difference between $\tau_{xy,T}$ and $\tau_{xy,R}$.

For example, following formulae may be used in calculating the sum of and the difference between $\tau_{xy,T}$ and $\tau_{xy,R}$:

in a case where two polarization states outputted by the adaptive equalizer are not interchanged, $$\tau_{xy,T} + \tau_{xy,R} = \frac{1}{2\pi} * \text{slope}(\varphi_+(f)), |f| \le f_0,$$

$$\tau_{xy,T} - \tau_{xy,R} = \frac{1}{2\pi} \text{slope}(\varphi_-(f)), |f| \le f_0;$$

and in a case where the two polarization states outputted by the adaptive equalizer are interchanged, $$-(\tau_{xy,T} - \tau_{xy,R}) = \frac{1}{2\pi} * \text{slope}(\varphi_+(f)), |f| \le f_0,$$

$$-(\tau_{xy,T} + \tau_{xy,R}) = \frac{1}{2\pi} \text{slope}(\varphi_-(f)), |f| \le f_0;$$

where, slope(•) denotes a function used for calculating a slope, $f_0>0$, and $f=n/N*f_s$, N being a positive integer and denoting the number of taps of the adaptive equalizer, n being an integer greater than or equal to $-N+\text{ceil}(N/2)$ and less than or equal to $\text{ceil}(N/2)-1$, ceil(•) denoting a rounded up function, and $f_s$ being a sampling rate of input signals of the adaptive equalizer.

Thus, the polarization skew $\tau_{xy,T}$ of the transmitting device and the polarization skew $\tau_{xy,R}$ of the receiving device may be estimated by using the coefficients of the adaptive equalizer, and signals at the transmitting and/or the receiving device may be calibrated according to the estimated $\tau_{xy,T}$ and $\tau_{xy,R}$. Compared with the compensation by DSP in the relevant art, the embodiments of this disclosure do not need expensive measurement instruments, which is not only low in cost, but also is applicable to calibration in a production stage, and is applicable to real-time monitoring of a transceiver in an actual optical transmission system.

The embodiment of this disclosure shall be described below by taking a 4×4 structure as an example.

Figure 4:
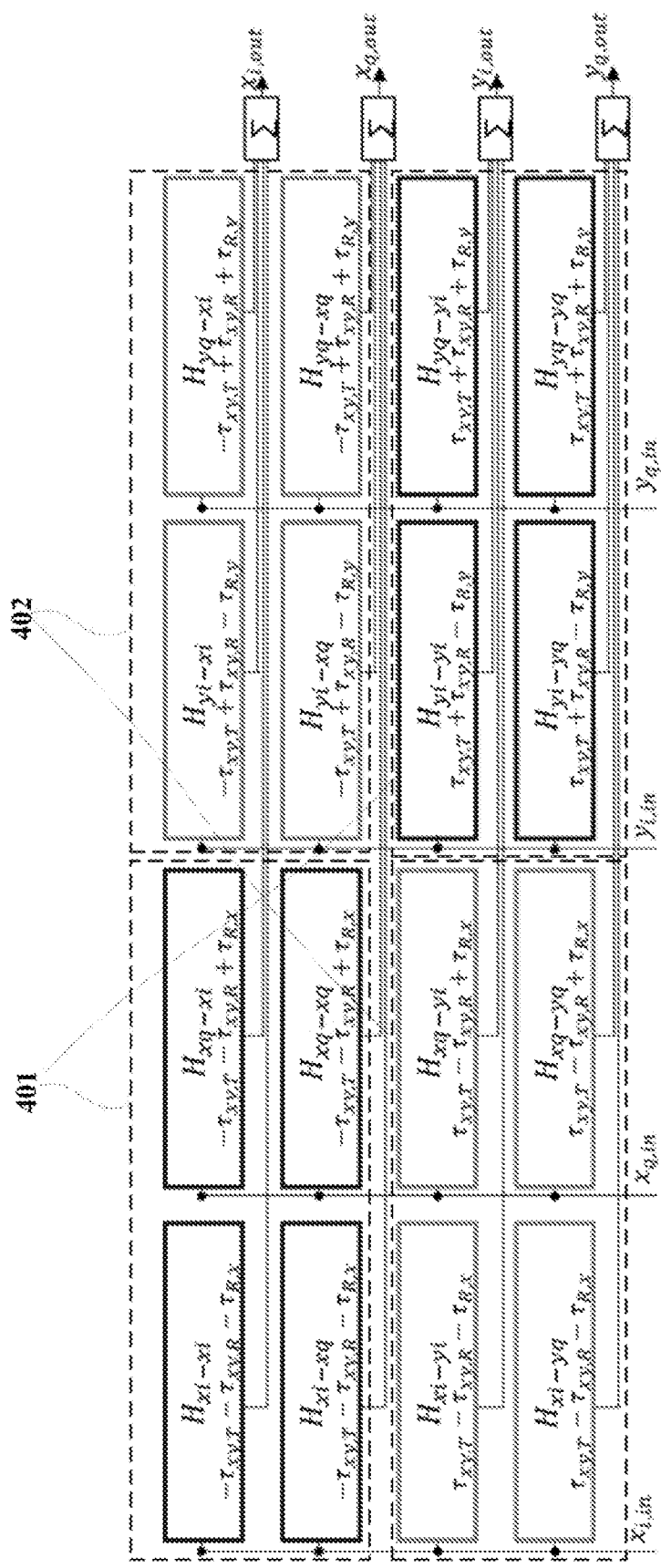
FIG. 4 is a schematic diagram of the adaptive equalizer is of a 4×4 structure according to an embodiment of this disclosure.

FIG. 4 is a schematic diagram of the adaptive equalizer of a 4×4 structure of the embodiment of this disclosure. As shown in FIG. 4, in the time domain, coefficients of each sub-filter are real numbers, and in the frequency domain, frequency responses of each sub-filter contain information on skew of the transceiver.

For example, in a back-to-back coherent optical communication system, there exists a frequency offset between a local oscillator laser and a transmitting device laser, and in FIG. 4, $H_{xi-xi}$ contains a component $e^{-j\omega(\tau_{xy,T}+\tau_{xy,R}+\tau_{R,x})}$, the polarization skew of the transmitting device and the receiving device and the in-phase orthogonal polarization skew at the x state of the receiving device, which are respectively denoted as $\tau_{xy,T}$, $\tau_{xy,R}$ and $\tau_{R,x}$; where $$\tau_{R,x} = \frac{\tau_{xq} - \tau_{xi}}{2},$$

and likewise, $$\tau_{R,y} = \frac{\tau_{yq} - \tau_{yi}}{2}.$$

For example, a part of the coefficients (as shown by 401 in FIG. 4) of the adaptive equalizer may be calculated to obtain the diagonal element parameters $\varphi_+(f)$, and another part of the coefficients (as shown by 402 in FIG. 4) of the adaptive equalizer may be calculated to obtain the secondary diagonal element parameters $\varphi_-(f)$. In this case, the diagonal element parameters and the secondary diagonal element parameters are expressed as follows:

$\varphi_{+,4\times4}(f)=0.5*\text{unwrap}(\arg((H_{yi-y1}+j*H_{yi-yq})*$
$(H_{yq-yi}+j*H_{yq-yq})*(H_{xi-xi}+j*H_{xi-xq})^{**}(H_{xq-xi}+$
$j*H_{xq-xq})^*))$, $\varphi_{-,4\times4}(f)=0.5*\text{unwrap}(\arg((H_{xi-y1}+j*H_{xi-yq})*$
$(H_{xq-yi}+j*H_{xq-yq})*(H_{yi-xi}+j*H_{yi-xq})^{**}(H_{yq-xi}+$
$j*H_{yq-xq})^*))$;

where, arg(•) denotes an argument calculation operation, unwrap(•) denotes operation correcting radian phase angles, for example, when a hop of an opposite adjacent phase angle is greater than or equal to π, correction is performed after an integer multiple of +2π is added to a current phase angle; (•)* denotes a conjugate operation, and H is a frequency response of the adaptive equalizer, that is, Fourier transform of the coefficients of the adaptive equalizer.

Then, the sum of and the difference between $\tau_{xy,T}$ and $\tau_{xy,R}$ may be calculated by using formulae as below:

in the case where the two polarization states outputted by the adaptive equalizer are not interchanged, $$\tau_{xy,T} + \tau_{xy,R} = \frac{1}{2\pi} * \text{slope}(\varphi_{+,4\times4}(f)), |f| \leq f_0,$$

$$\tau_{xy,T} - \tau_{xy,R} = \frac{1}{2\pi} \text{slope}(\varphi_{-,4\times4}(f)), |f| \leq f_0;$$

and in the case where the two polarization states outputted by the adaptive equalizer are interchanged.

$$-(\tau_{xy,T} - \tau_{xy,R}) = \frac{1}{2\pi} * \text{slope}(\varphi_{+,4\times4}(f)), |f| \leq f_0,$$

$$-(\tau_{xy,T} + \tau_{xy,R}) = \frac{1}{2\pi} \text{slope}(\varphi_{-,4\times4}(f)), |f| \leq f_0;$$

where, the function slope(•) is used for calculating a slope, and a frequency range here used for calculating the slope is $[-f_0, f_0]$ ($f_0 > 0$). In order to estimate exact polarization skew, appropriate $f_0$ may be selected, for example, $f_0 = f_s/4$, $f_s$ being a sampling rate of input signals of the equalizer.

The embodiment of this disclosure shall be described below by taking a 4×2 structure as an example.

Figure 5:
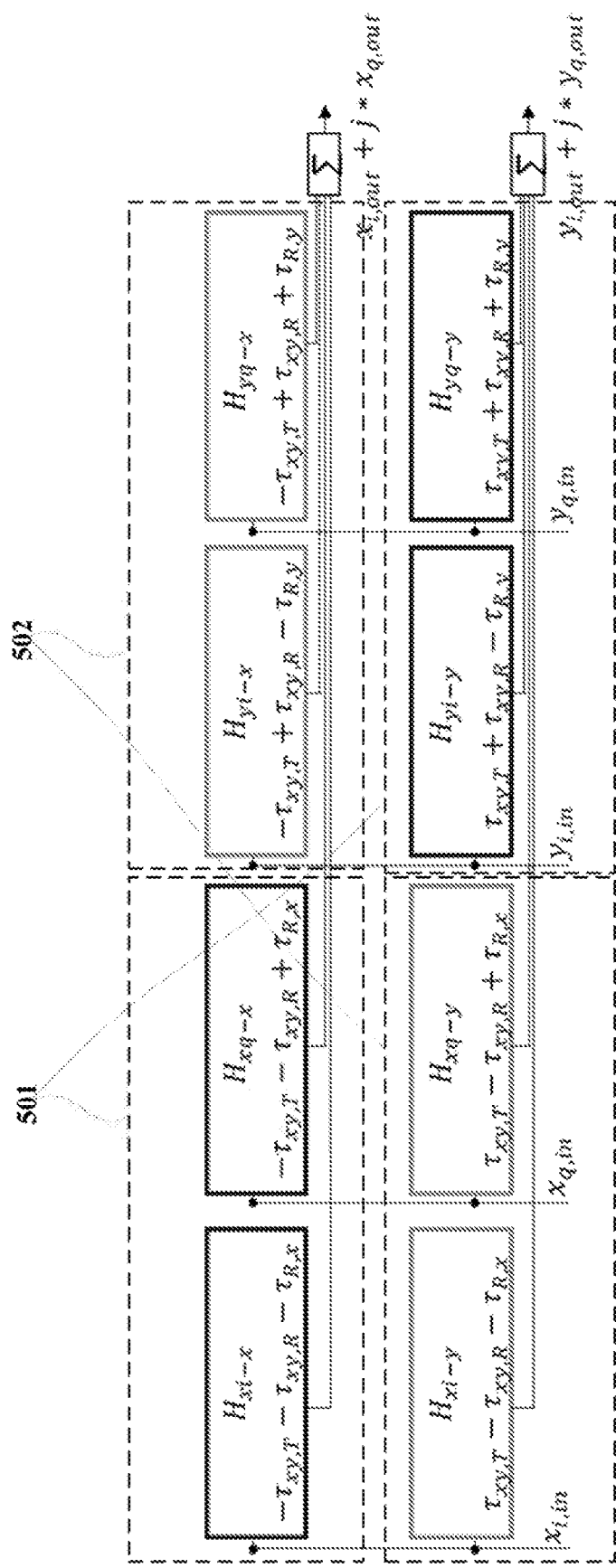
FIG. 5 is a schematic diagram of the adaptive equalizer is of a 4×2 structure according to an embodiment of this disclosure.

FIG. 5 is a schematic diagram of the adaptive equalizer of a 4×2 structure of the embodiment of this disclosure. As shown in FIG. 5, in the time domain, coefficients of each sub-filter are real numbers, and in the frequency domain, frequency responses of each sub-filter contain information on skew of the transceiver.

Similar to the 4×4 structure, when the adaptive equalizer is of a 4×2 structure, a part of the coefficients (as shown by 501 in FIG. 5) of the adaptive equalizer may be calculated to obtain the diagonal element parameters $\varphi_+(f)$, and another part of the coefficients (as shown by 502 in FIG. 5) of the adaptive equalizer may be calculated to obtain the secondary diagonal element parameters $\varphi_-(f)$. In this case, the diagonal element parameters and the secondary diagonal element parameters are expressed as follows:

$$\varphi_{+,4\times2}(f) = \frac{1}{2} \arg[H_{yi-y} * H_{yq-y} * H_{xi-x}^{*} * H_{xq-x}^{*}],$$

$$\varphi_{-,4\times2}(f) = \frac{1}{2} \arg[H_{xi-y} * H_{xq-y} * H_{yi-x}^{*} * H_{yq-x}^{*}];$$

where, arg(•) denotes an argument calculation operation, (•)* denotes a conjugate operation, and H is a frequency response of the adaptive equalizer, that is, Fourier transform of the coefficients of the adaptive equalizer.

Then, the sum of and the difference between $\tau_{xy,T}$ and $\tau_{xy,R}$ may be calculated by using formulae as below:

in the case where the two polarization states outputted by the adaptive equalizer are not interchanged, $$\tau_{xy,T} + \tau_{xy,R} = \frac{1}{2\pi} * \text{slope}(\varphi_{+,4\times2}(f)), |f| \leq f_0,$$

$$\tau_{xy,T} - \tau_{xy,R} = \frac{1}{2\pi} \text{slope}(\varphi_{-,4\times2}(f)), |f| \leq f_0;$$

and in the case where the two polarization states outputted by the adaptive equalizer are interchanged, $$-(\tau_{xy,T} - \tau_{xy,R}) = \frac{1}{2\pi} * \text{slope}(\varphi_{+,4\times2}(f)), |f| \leq f_0,$$

$$-(\tau_{xy,T} + \tau_{xy,R}) = \frac{1}{2\pi} \text{slope}(\varphi_{-,4\times2}(f)), |f| \leq f_0;$$

where, the function slope(•) is used for calculating a slope, and a frequency range here used for calculating the slope is $[-f_0, f_0]$ ($f_0 > 0$). In order to estimate exact polarization skew, appropriate $f_0$ may be selected, for example, $f_0 = f_s/4$, $f_s$ being a sampling rate of input signals of the equalizer.

The embodiment of this disclosure shall be described below by taking a 2×2 structure as an example.

Figure 6:
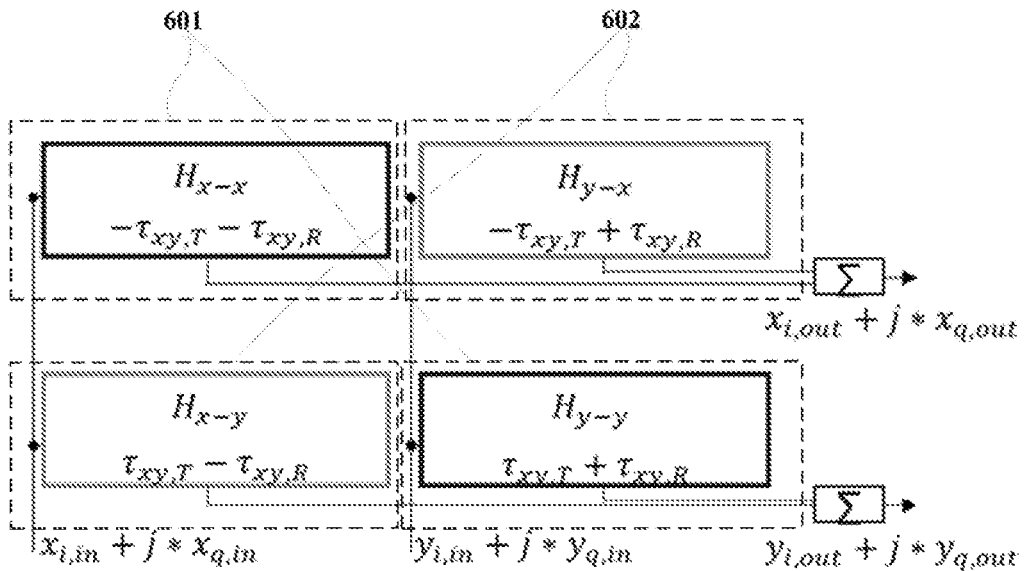
FIG. 6 is a schematic diagram of the adaptive equalizer is of a 2×2 structure according to an embodiment of this disclosure.

FIG. 6 is a schematic diagram of the adaptive equalizer of a 2×2 structure of the embodiment of this disclosure. As shown in FIG. 5, in the time domain, coefficients of each sub-filter are real numbers, and in the frequency domain, frequency responses of each sub-filter contain information on skew of the transceiver.

Similar to the 4×4 structure, when the adaptive equalizer is of a 2×2 structure, for example, a part of the coefficients (as shown by 601 in FIG. 6) of the adaptive equalizer may be calculated to obtain the diagonal element parameters $\varphi_+(f)$, and another part of the coefficients (as shown by 602 in FIG. 6) of the adaptive equalizer may be calculated to obtain the secondary diagonal element parameters $\varphi_-(f)$. In this case, the diagonal element parameters and the secondary diagonal element parameters are expressed as follows:

$$\varphi_{+,2\times2}(f) = \frac{1}{2} \arg[H_{y-y} * H_{x-x}^{*}],$$

$$\varphi_{-,2\times2}(f) = \frac{1}{2} \arg[H_{x-y} * H_{y-x}^{*}];$$

where, arg(•) denotes an argument calculation operation, (•)* denotes a conjugate operation, and H is a frequency response of the adaptive equalizer, that is, Fourier transform of the coefficients of the adaptive equalizer.

Then, the sum of and the difference between $\tau_{xy,T}$ and $\tau_{xy,R}$ may be calculated by using formulae as below:

in the case where the two polarization states outputted by the adaptive equalizer are not interchanged, $$\tau_{xy,T} + \tau_{xy,R} = \frac{1}{2\pi} * \text{slope}(\varphi_{+,2\times2}(f)), |f| \leq f_0,$$

$$\tau_{xy,T} - \tau_{xy,R} = \frac{1}{2\pi} \text{slope}(\varphi_{-,2\times2}(f)), |f| \leq f_0;$$

and in the case where the two polarization states outputted by the adaptive equalizer are interchanged, $$-(\tau_{xy,T} - \tau_{xy,R}) = \frac{1}{2\pi} * \text{slope}(\varphi_{+,4\times2}(f)), |f| \leq f_0,$$

$$-(\tau_{xy,T} + \tau_{xy,R}) = \frac{1}{2\pi} \text{slope}(\varphi_{-,4\times2}(f)), |f| \leq f_0;$$

where, the function slope(•) is used for calculating a slope, and a frequency range here used for calculating the slope is $[-f_0, f_0]$ ($f_0 > 0$). In order to estimate exact polarization skew, appropriate $f_0$ may be selected, for example, $f_0 = f_s/4$, $f_s$ being a sampling rate of input signals of the equalizer.

It should be appreciated that the above description is given by taking the 4×4 structure, the 4×2 structure and the 2×2 structure of the adaptive equalizer as examples; however, this disclosure is not limited thereto, and it may be extended to other structures, for example. Furthermore, the above description is given by taking calculating the sum of and difference between $\tau_{xy,T}$ and $\tau_{xy,R}$ and then obtaining $\tau_{xy,T}$ and $\tau_{xy,R}$ as examples; however, this disclosure is not limited thereto. Appropriate variants may be made to the coefficients of the adaptive equalizer, and a particular method of calculation is not limited in the embodiments of this disclosure.

In an embodiment, the plurality of coefficients of the adaptive equalizer of the receiving device may be acquired multiple times after polarization states of received signals are changed, and the plurality of coefficients of the adaptive equalizer may be processed (such as filtering, and averaging).

For example, during the monitoring procedure, the polarization states of the transmitter and receiver may be just aligned or rotated by 90 degrees. In these two cases, the above sub-filters of the secondary diagonal elements (e.g. as shown by 402 in FIG. 4) or the diagonal elements (e.g. as shown by 401 in FIG. 4) of the equalizer are zero, and are unable to provide sufficient monitoring information.

Therefore, in order to improve accuracy of the monitoring result, the polarization states of the received signals may be changed multiple times (or may be monitored again after the polarization states of the received signals are changed), and the monitoring is performed in different polarization states. Then, after removing possible existed mutation monitoring values (possibly encountering the above two types of unsupported polarization states), an average monitoring value is taken as the polarization skew of the transceiver.

It should be appreciated that the embodiments of this disclosure are only illustrated in the above drawings; however, this disclosure is not limited thereto. For example, an order of execution of the operations may be appropriately adjusted, and furthermore, some other operations may be added, or some operations therein may be reduced. And appropriate variants may be made by those skilled in the art according to the above contents, without being limited to what is contained in above drawings.

The operations or processes related to this disclosure are only described above; however, this disclosure is not limited thereto. The method for estimating polarization skew may further include other operations or processes, and reference may be made to the relevant art for particular contents of these operations or processes. Furthermore, how to calculate in the embodiments of this disclosure is illustrated above by taking the above formulae as examples; however, this disclosure is not limited to these formulae, appropriate variants may be made to these formulae, and implementations of these variants are all covered by the scope of the embodiments of this disclosure.

It can be seen from the above embodiments that the polarization skew of the transmitting device and the polarization skew of the receiving device may be estimated by using the coefficients of the adaptive equalizer, without needing expensive measurement instruments, which is not only low in cost, but also is applicable to calibration in a production stage, and is applicable to real-time monitoring of a transceiver in an actual optical transmission system.

Embodiment 2

These embodiments of this disclosure provide an apparatus for estimating polarization skew, which may be configured in a receiver, or may be independent of a receiver. These embodiments correspond to the method for estimating of Embodiment 1, with identical contents being not going to be described herein any further.

Figure 7:
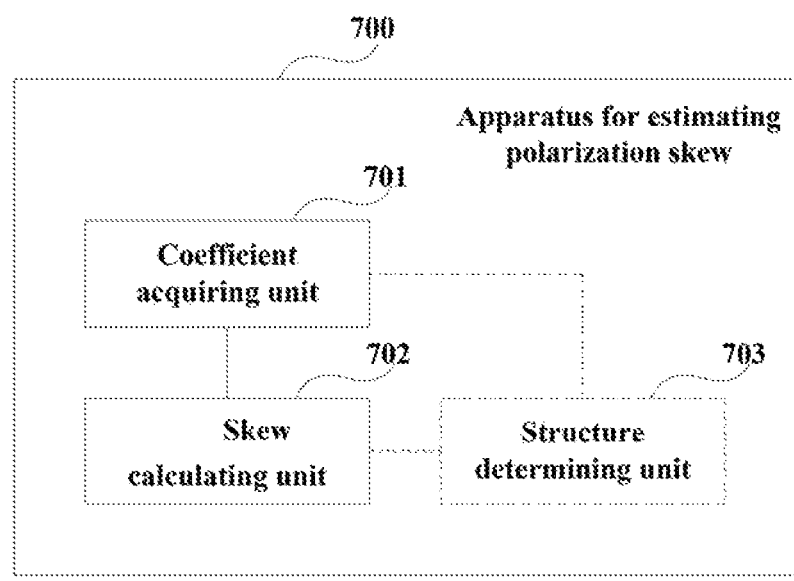
FIG. 7 is a schematic diagram of the apparatus for estimating polarization skew according to an embodiment of this disclosure.

FIG. 7 is a schematic diagram of the apparatus for estimating polarization skew of the embodiment of this disclosure. As shown in FIG. 7, an apparatus 700 for estimating polarization skew includes:

a coefficient acquiring unit 701 configured to acquire a plurality of coefficients of an adaptive equalizer of a receiving device; the coefficients of the adaptive equalizer at least include the following components: polarization skew of a transmitting device and polarization skew of the receiving device; and a skew calculating unit 702 configured to calculate the polarization skew of the transmitting device and the polarization skew of the receiving device according to the plurality of coefficients of the adaptive equalizer.

As shown in FIG. 7, the apparatus 700 may further include:

a structure determining unit 703 configured to determine a structure of the adaptive equalizer according to the plurality of coefficients of the adaptive equalizer.

In an embodiment, the coefficients of the adaptive equalizer further include the following components: in-phase quadrature skew of an x polarization state of the receiving device, and/or in-phase quadrature skew of ay polarization state of the receiving device;

and the skew calculating unit 702 may further calculate the plurality of coefficients of the adaptive equalizer to eliminate components of the in-phase quadrature skew of the x polarization state of the receiving device and the in-phase quadrature skew of they polarization state of the receiving device, and reserve components of the polarization skew of the transmitting device and the polarization skew of the receiving device.

In an embodiment, the skew calculating unit 702 may be configured to: calculate a part of the coefficients of the adaptive equalizer to obtain diagonal element parameters $\varphi_+(f)$, and calculate another part of the coefficients of the adaptive equalizer to obtain secondary diagonal element parameters $\varphi_-(f)$; calculate a sum of and a difference between the polarization skew $\tau_{xy,T}$ of the transmitting device and the polarization skew $\tau_{xy,R}$ of the receiving device according to the diagonal element parameters $\varphi_+(f)$ and the secondary diagonal element parameters $\varphi_-(f)$; and calculate $\tau_{xy,T}$ and $\tau_{xy,R}$ according to the sum of and the difference between $\tau_{xy,T}$ and $\tau_{xy,R}$.

In an embodiment, following formulae may be used in calculating the sum of and the difference between $\tau_{xy,T}$ and $\tau_{xy,R}$:

in a case where two polarization states outputted by the adaptive equalizer are not interchanged, $$\tau_{xy,T} + \tau_{xy,R} = \frac{1}{2\pi} * \text{slope}(\varphi_+(f)), |f| \le f_0,$$

$$\tau_{xy,T} - \tau_{xy,R} = \frac{1}{2\pi} \text{slope}(\varphi_-(f)), |f| \le f_0;$$

and in a case where the two polarization states outputted by the adaptive equalizer are interchanged, $$-(\tau_{xy,T} - \tau_{xy,R}) = \frac{1}{2\pi} * \text{slope}(\varphi_+(f)), |f| \le f_0,$$

$$-(\tau_{xy,T} + \tau_{xy,R}) = \frac{1}{2\pi} \text{slope}(\varphi_-(f)), |f| \le f_0;$$

where, slope(•) denotes a function used for calculating a slope, $f_0 > 0$, and $f = n/N * f_s$, N being a positive integer and denoting the number of taps of the adaptive equalizer, n being an integer greater than or equal to $-N + \text{ceil}(N/2)$ and less than or equal to $\text{ceil}(N/2) - 1$, cell(•) denoting a rounded up function, and $f_s$ being a sampling rate of input signals of the adaptive equalizer.

For example, the adaptive equalizer is of a 4×4 structure, and the diagonal element parameters and the secondary diagonal element parameters are expressed as follows:

$$\varphi_{+,4\times4}(f) = 0.5 * \text{unwrap}(\arg((H_{yi-yi} + j*H_{yi-yq})* (H_{yq-yi} + j*H_{yq-yq})*(H_{xi-xi} + j*H_{xi-xq})**(H_{xq-xi} + j*H_{xq-xq})*)),$$

$$\varphi_{-,4\times4}(f) = 0.5 * \text{unwrap}(\arg((H_{xi-yi} + j*H_{xi-yq})* (H_{xq-yi} + j*H_{xq-yq})*(H_{yi-xi} + j*H_{yi-xq})**(H_{yq-xi} + j*H_{yq-xq})*));$$

where, arg(•) denotes an argument calculation operation, unwrap(•) denotes operation correcting radian phase angles, (•)* denotes a conjugate operation, and H is a frequency response of the adaptive equalizer, that is, Fourier transform of the coefficients of the adaptive equalizer.

For example, the adaptive equalizer is of a 4×2 structure, and the diagonal element parameters and the secondary diagonal element parameters are expressed as follows:

$$\varphi_{+,4\times2}(f) = \frac{1}{2} \arg[H_{yi-y} * H_{yq-y} * H_{xi-x}^* * H_{xq-x}^*],$$

$$\varphi_{-,4\times2}(f) = \frac{1}{2} \arg[H_{xi-y} * H_{xq-y} * H_{yi-x}^* * H_{yq-x}^*];$$

where, arg(•) denotes an argument calculation operation, (•)* denotes a conjugate operation, and H is a frequency response of the adaptive equalizer, that is, Fourier transform of the coefficients of the adaptive equalizer.

For another example, the adaptive equalizer is of a 2×2 structure, and the diagonal element parameters and the secondary diagonal element parameters are expressed as follows:

$$\varphi_{+,2\times2}(f) = \frac{1}{2} \arg[H_{y-y} * H_{x-x}^*],$$

$$\varphi_{-,2\times2}(f) = \frac{1}{2} \arg[H_{x-y} * H_{y-x}^*];$$

where, arg(•) denotes an argument calculation operation, (•)* denotes a conjugate operation, and H is a frequency response of the adaptive equalizer, that is, Fourier transform of the coefficients of the adaptive equalizer.

In an embodiment, the coefficient acquiring unit 701 may further be configured to acquire the plurality of coefficients of the adaptive equalizer of the receiving device multiple times after polarization states of received signals are changed, and process the plurality of coefficients of the adaptive equalizer.

It should be appreciated that the parts related to this disclosure are only described above; however, this disclosure is not limited thereto. The apparatus 700 for estimating polarization skew may further include other parts or modules, and reference may be made to the relevant art for particular contents of these parts or modules.

It can be seen from the above embodiments that the polarization skew of the transmitting device and the polarization skew of the receiving device may be estimated by using the coefficients of the adaptive equalizer, without needing expensive measurement instruments, which is not only low in cost, but also is applicable to calibration in a production stage, and is applicable to real-time monitoring of a transceiver in an actual optical transmission system.

Embodiment 3

These embodiments of this disclosure provide a receiver, which may be configured with the apparatus 700 for estimating polarization skew as described in Embodiment 2, with contents in these embodiments identical to those in embodiments 1 and 2 being not going to be described herein any further. Following description shall be given by taking an optical receiver in an optical communication system as an example; however, this disclosure is not limited thereto.

Figure 8:
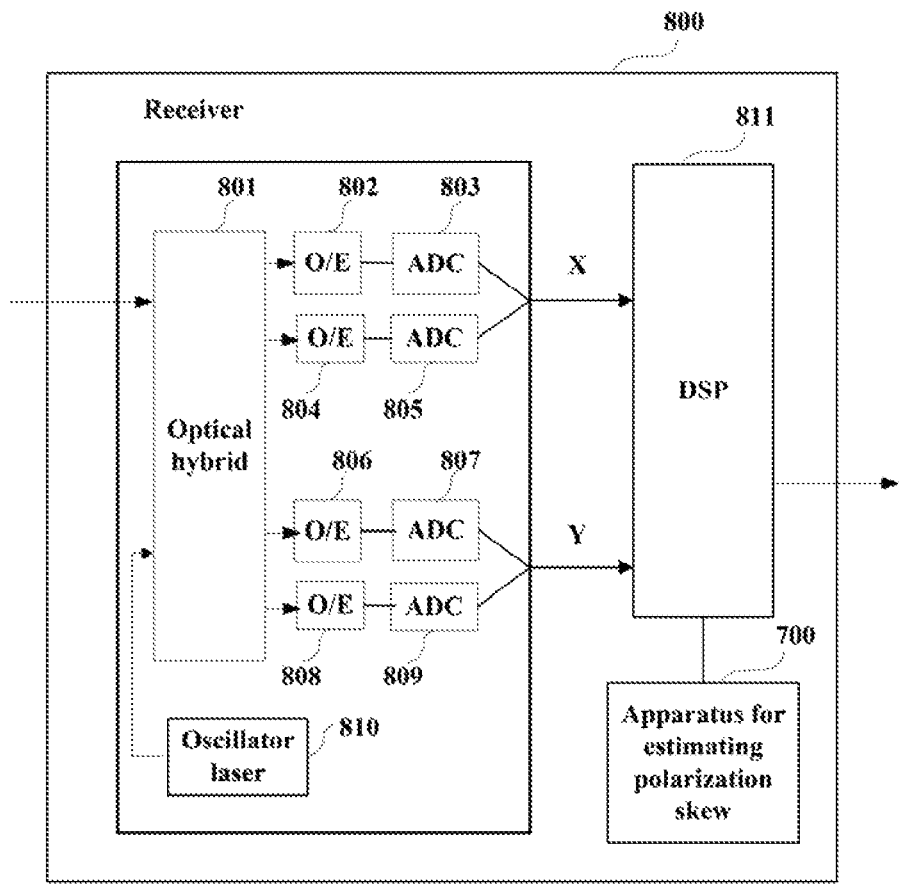
FIG. 8 is a schematic diagram of the receiver according to an embodiment of this disclosure.

FIG. 8 is a schematic diagram of the receiver of the embodiment of this disclosure, which shall be described by taking dual-polarization states as an example. As shown in FIG. 8, a receiver 800 includes: an oscillator laser 810, an optical hybrid 801, opto-electronic (O/E) detectors 802, 804, 806 and 808, analog-to-digital converters (ADCs) 803, 805, 807 and 809, and a digital signal processor 811.

The oscillator laser 810 is configured to provide a local light source; an optical signal is converted into a baseband signal in a polarization state after passing through the optical hybrid 801, the opto-electronic (O/E) detectors 802 and 804 and the analog-to-digital converters (ADCs) 803 and 805; and the optical signal is converted into a baseband signal in another polarization state after passing through the optical hybrid 801, the opto-electronic (O/E) 806 and 808 and the analog-to-digital converters (ADCs) 807 and 809, with a detailed process being similar to that in the relevant art, and being not going to be described herein any further.

The digital signal processor 811 may include an adaptive equalizer (not shown in FIG. 8). As shown in FIG. 8, the receiver 800 may further include the apparatus 700 for estimating polarization skew. Thus, the embodiments of this disclosure may be applicable to real-time monitoring of a transceiver in an actual optical transmission system.

Furthermore, the receiver 800 may include a dispersion compensator, etc. (not shown in FIG. 8). And if a frequency offset and a phase noise have an effect on estimation of linear crosstalk, the receiver 800 may further include a frequency offset compensator and a phase noise compensator (not shown in FIG. 8). That is, the receiver 800 may further include a dispersion compensator, a frequency offset compensator, and a phase noise compensator, etc.; however, this disclosure is not limited thereto.

It should be appreciated that the receiver of this disclosure is only illustrated in FIG. 8; however, this disclosure is not limited thereto. The receiver 800 does not necessarily include all the parts shown in FIG. 8; and furthermore, receiver 800 may include parts not shown in FIG. 8, and reference may be made to the relevant art.

In an embodiment, the apparatus 700 for estimating polarization skew of an embodiment of this disclosure may be independent of the receiver 800. And furthermore, the apparatus for estimating polarization skew may employ a structure of a universal computer, hence, the embodiments of this disclosure may be applicable to calibration in a production stage.

Figure 9:
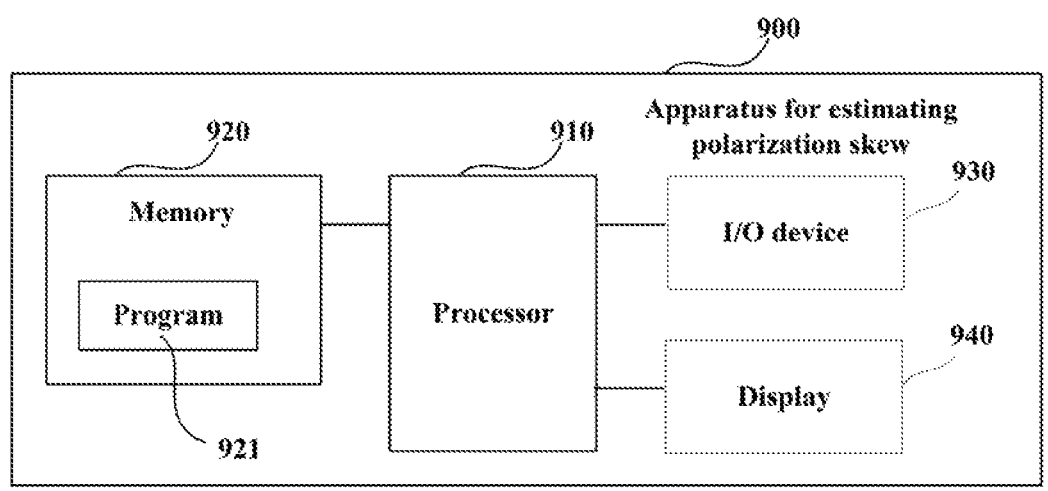
FIG. 9 is a schematic diagram of the apparatus for estimating polarization skew according to an embodiment this disclosure.

FIG. 9 is a schematic diagram of a structure of the apparatus for estimating polarization skew of the embodiment of this disclosure. As shown in FIG. 9, an apparatus 900 for estimating polarization skew may include a processor 910 (such as a central processing unit (CPU)) and a memory 920, the memory 920 being coupled to the processor 910. The memory 920 may store various data, and furthermore, it may store a program 921 for data processing, and execute the program 921 under control of the processor 910.

For example, the processor 910 may be configured to carry out the method for estimating polarization skew described in Embodiment 1. For example, the processor 910 may be configured to perform the following control: acquiring a plurality of coefficients of an adaptive equalizer of a receiving device; wherein, the coefficients of the adaptive equalizer at least include the following components: polarization skew of a transmitting device and polarization skew of the receiving device; and calculating the polarization skew of the transmitting device and the polarization skew of the receiving device according to the plurality of coefficients of the adaptive equalizer.

Furthermore, as shown in FIG. 9, the apparatus 900 for estimating polarization skew may include an input/output (I/O) device 930, and a display 940, etc.; functions of the above components are similar to those in the relevant art, which shall not be described herein any further. It should be appreciated that the apparatus 900 for estimating polarization skew does not necessarily include all the parts shown in FIG. 9; and furthermore, it may include parts not shown in FIG. 9, and reference may be made to the relevant art.

The above apparatuses and methods of this disclosure may be implemented by hardware, or by hardware in combination with software. This disclosure relates to such a computer-readable program that when the program is executed by a logic device, the logic device is enabled to carry out the apparatus or components as described above, or to carry out the methods or operations as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in the drawings may either correspond to software modules of procedures of a computer program, or correspond to hardware modules. Such software modules may respectively correspond to the operations shown in the drawings. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communication combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the spirits and principle of the present disclosure, and such variants and modifications fall within the scope of the present disclosure.

What is claimed is:

1. An apparatus for estimating polarization skew, comprising:
a processor configured to acquire a plurality of coefficients of an adaptive equalizer of a receiving device, the plurality of coefficients of the adaptive equalizer comprise a polarization skew of a transmitting device and a polarization skew of the receiving device; and
a calculator configured to calculate the polarization skew of the transmitting device and the polarization skew of the receiving device according to the plurality of coefficients of the adaptive equalizer,
wherein the calculator is configured to:
calculate a part of the plurality of coefficients of the adaptive equalizer to obtain primary diagonal element parameters $\varphi_+(f)$, and calculate another part of the plurality of coefficients of the adaptive equalizer to obtain secondary diagonal element parameters $\varphi_-(f)$;
calculate a sum of and a difference between the polarization skew $\tau_{xy,T}$ of the transmitting device and the polarization skew $\tau_{xy,R}$ of the receiving device according to the primary diagonal element parameters $\varphi_+(f)$ and the secondary diagonal element parameters $\varphi_-(f)$; and
calculate $\tau_{xy,T}$ and $\tau_{xy,R}$ according to the sum of and the difference between $\tau_{xy,T}$ and $\tau_{xy,R}$.

2. The apparatus according to claim 1, wherein the processor is further configured to determine a structure of the adaptive equalizer according to the plurality of coefficients of the adaptive equalizer.

3. The apparatus according to claim 1, wherein the plurality of coefficients of the adaptive equalizer further comprise: in-phase quadrature skew of an x polarization state of the receiving device, and/or in-phase quadrature skew of a y polarization state of the receiving device; and
the calculator calculates the plurality of coefficients of the adaptive equalizer to eliminate components of the in-phase quadrature skew of the x polarization state of the receiving device and the in-phase quadrature skew of the y polarization state of the receiving device, and reserve components of the polarization skew of the transmitting device and the polarization skew of the receiving device.

4. The apparatus according to claim 1, wherein following formulae are used in calculating the sum of and the difference between $\tau_{xy,T}$ and $\tau_{xy,R}$:

in a case where two polarization states outputted by the adaptive equalizer are not interchanged, $$\tau_{xy,T} + \tau_{xy,R} = \frac{1}{2\pi} * \text{slope}(\varphi_+(f)), |f| \le f_0,$$

$$\tau_{xy,T} - \tau_{xy,R} = \frac{1}{2\pi} \text{slope}(\varphi_-(f)), |f| \le f_0;$$

in a case where the two polarization states outputted by the adaptive equalizer are interchanged, $$-(\tau_{xy,T} - \tau_{xy,R}) = \frac{1}{2\pi} * \text{slope}(\varphi_+(f)), |f| \le f_0,$$

$$-(\tau_{xy,T} + \tau_{xy,R}) = \frac{1}{2\pi} \text{slope}(\varphi_-(f)), |f| \le f_0;$$

where, slope(•) denotes a function used for calculating a slope, $f_0>0$, and $f=n/N*f_s$, N being a positive integer and denoting the number of taps of the adaptive equalizer, n being an integer greater than or equal to $-N+\text{ceil}(N/2)$ and less than or equal to $\text{ceil}(N/2)-1$, cell(•) denoting a rounded up function, and fs being a sampling rate of input signals of the adaptive equalizer.

5. The apparatus according to claim 4, wherein the adaptive equalizer is of a 4×4 structure, and the primary diagonal element parameters and the secondary diagonal element parameters are expressed as follows:

$$\varphi_{+,4\times 4}(f)=0.5*\text{unwrap}(\arg((H_{yi-yi}+j*H_{yi-yq})* (H_{yq-yi}+j*H_{yq-yq})*(H_{xi-xi}+j*H_{xi-xq})^{**}(H_{xq-xi}+j*H_{xq-xq})^*)),$$

$$\varphi_{-,4\times 4}(f)=0.5*\text{unwrap}(\arg((H_{xi-yi}+j*H_{xi-yq})* (H_{xq-yi}+j*H_{xq-yq})*(H_{yi-xi}+j*H_{yi-xq})^{**}(H_{yq-xi}+j*H_{yq-xq})^*));$$

where, arg(•) denotes an argument calculation operation, unwrap(•) denotes operation correcting radian phase angles, (•)* denotes a conjugate operation, and H is a frequency response of the adaptive equalizer, that is, Fourier transform of the plurality of coefficients of the adaptive equalizer.

6. The apparatus according to claim 4, wherein the adaptive equalizer is of a 4×2 structure, and the primary diagonal element parameters and the secondary diagonal element parameters are expressed as follows:

$$\varphi_{+,4\times 2}(f) = \frac{1}{2}\arg[H_{yi-y} * H_{yq-y} * H^*_{xi-x} * H^*_{xq-x}],$$

$$\varphi_{-,4\times 2}(f) = \frac{1}{2}\arg[H_{xi-y} * H_{xq-y} * H^*_{yi-x} * H^*_{yq-x}];$$

where, arg(•) denotes an argument calculation operation, (•)* denotes a conjugate operation, and H is a frequency response of the adaptive equalizer, that is, Fourier transform of the plurality of coefficients of the adaptive equalizer.

7. The apparatus according to claim 4, wherein the adaptive equalizer is of a 2×2 structure, and the primary diagonal element parameters and the secondary diagonal element parameters are expressed as follows:

$$\varphi_{+,2\times 2}(f) = \frac{1}{2}\arg[H_{y-y} * H^*_{x-x}],$$

$$\varphi_{-,2\times 2}(f) = \frac{1}{2}\arg[H_{x-y} * H^*_{y-x}];$$

where, arg(•) denotes an argument calculation operation, (•)* denotes a conjugate operation, and H is a frequency response of the adaptive equalizer, that is, Fourier transform of the plurality of coefficients of the adaptive equalizer.

8. The apparatus according to claim 1, wherein the processor is further configured to acquire the plurality of coefficients of the adaptive equalizer of the receiving device multiple times after polarization states of received signals are changed, and process the plurality of coefficients of the adaptive equalizer.

9. A method for estimating polarization skew, comprising:
acquiring a plurality of coefficients of an adaptive equalizer of a receiving device; the plurality of coefficients of the adaptive equalizer comprise a polarization skew of a transmitting device and a polarization skew of the receiving device; and
calculating the polarization skew of the transmitting device and the polarization skew of the receiving device according to the plurality of coefficients of the adaptive equalizer,
wherein the calculating the polarization skew of the transmitting device and the polarization skew of the receiving device according to the plurality of coefficients of the adaptive equalizer comprises:
calculating a part of the coefficients of the adaptive equalizer to obtain primary diagonal element parameters $\varphi_+(f)$, and calculate another part of the coefficients of the adaptive equalizer to obtain secondary diagonal element parameters $\varphi_-(f)$,
calculating a sum of and a difference between the polarization skew $\tau_{xy,T}$ of the transmitting device and the polarization skew $\tau_{xy,R}$ of the receiving device according to the primary diagonal element parameters $\varphi_+(f)$ and the secondary diagonal element parameters $\varphi_-(f)$, and
calculating $\tau_{xy,T}$ and $\tau_{xy,R}$ according to the sum of and the difference between $\tau_{xy,T}$ and $\tau_{xy,R}$.

* * * * *